INVENTORS
Richard C. Peck
Elbert W. Atkins

Fig. 2
| PRECIPITATION FORMS | CODED OUTPUTS | | | |
|---|---|---|---|---|
| | Ry-1 | Ry-2 | Ry-3 | Ry-4 |
| DEW, LIGHT | 1 | 0 | 0 | 0 |
| DEW, HEAVY, OR DRIZZLE | 1 | 0 | 0 | 1 |
| FROST | 1 | 1 | 0 | 0 |
| RAIN | 1 | 0 | 1 | 1 |
| SNOW | 1 | 1 | 1 | 0 |
| FREEZING RAIN OR MELTING SNOW | 1 | 1 | 1 | 1 |
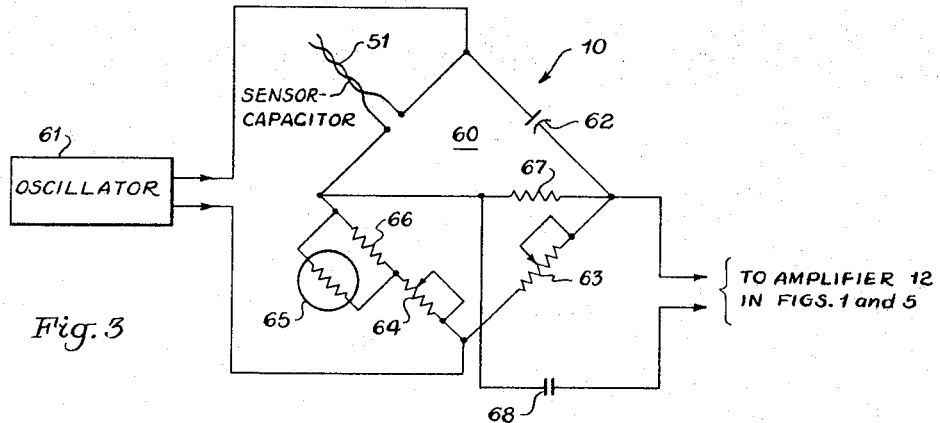
Fig. 3
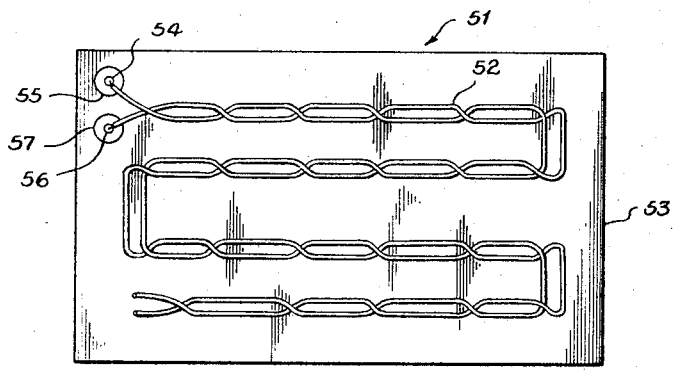
Fig. 4

United States Patent Office 3,428,890
Patented Feb. 18, 1969

3,428,890
SYSTEM FOR DETERMINING THE TYPE OF ATMOSPHERIC PRECIPITATION BY DETECTING METEOROLOGICAL PARAMETERS
Richard C. Peck and Elbert W. Atkins, Herndon, Va., assignors to the United States of America as represented by the Secretary of Commerce
Filed May 23, 1966, Ser. No. 552,645
U.S. Cl. 324—61            3 Claims
Int. Cl. G01r 27/26

ABSTRACT OF THE DISCLOSURE

Four parameters are detected to determine the presence of six types of atmospheric precipitation. Detectors sense the presence of all forms of precipitation, of the frost point, or rain, snow or sleet, and the presence of all liquid precipitation. The output of the detectors are used to indicate light dew, heavy dew or drizzle, frost, rain, snow, and freezing rain or melting snow.

This invention relates to a selective precipitation indicator system and in particular to a system that generates electrical signals that correspond to certain types of precipitation such as dew, frost, rain or snow.

In many applications it is convenient to have a system that responds to selected parameters of the atmosphere to indicate the type of precipitation at a remote site. One system in the prior art accomplishes this objective, but does not detect two very important moisture forms, namely dew and frost. The system evaluates a combination of parameters that require complex electro-mechanical sensors that are too critical for practical calibration and maintenance procedures or for long term operation at unmanned, remotely located sites. The sensors, which detect mass accumulation, rebound, impact and photo-optical effects, contain mechanical and moving parts that are exposed to the atmosphere and are subject to contamination by pollution, bird droppings, and blown dust or sand. In addition some of the sensors can be adversely affected by wind. The impact sensor, for example, comprises a generally hemispherical plate, on which precipitation particles fall, mechanically coupled to an electromechanical transducer which produces electrical signals corresponding to the kinetic energy of the particle. This sensor has the disadvantage that wind loading on the hemispherical plate will reduce sensitivity to impact. The plate will accumulate a cushioning coating of atmospheric contaminates and there will be an accumulation of contaminates between the plate and its housing. The sensor requires critical adjustment and its output threshold amplitudes are difficult to maintain.

Accordingly, it is an object of the present invention to provide a selective precipitation indicator system wherein the combination of meteorological parameters that are sensed permit the use of electrical detector circuits that are reliable and easy to calibrate.

Another object is to provide a combination of electrical detector circuits of meteorological parameters that form a selective precipitation detector system that is reliable and calls for few critical adjustments.

Another object is to provide a system that will distinguish between light dew, heavy dew or drizzle, frost, rain, snow and freezing rain or melting snow.

Figure 1:
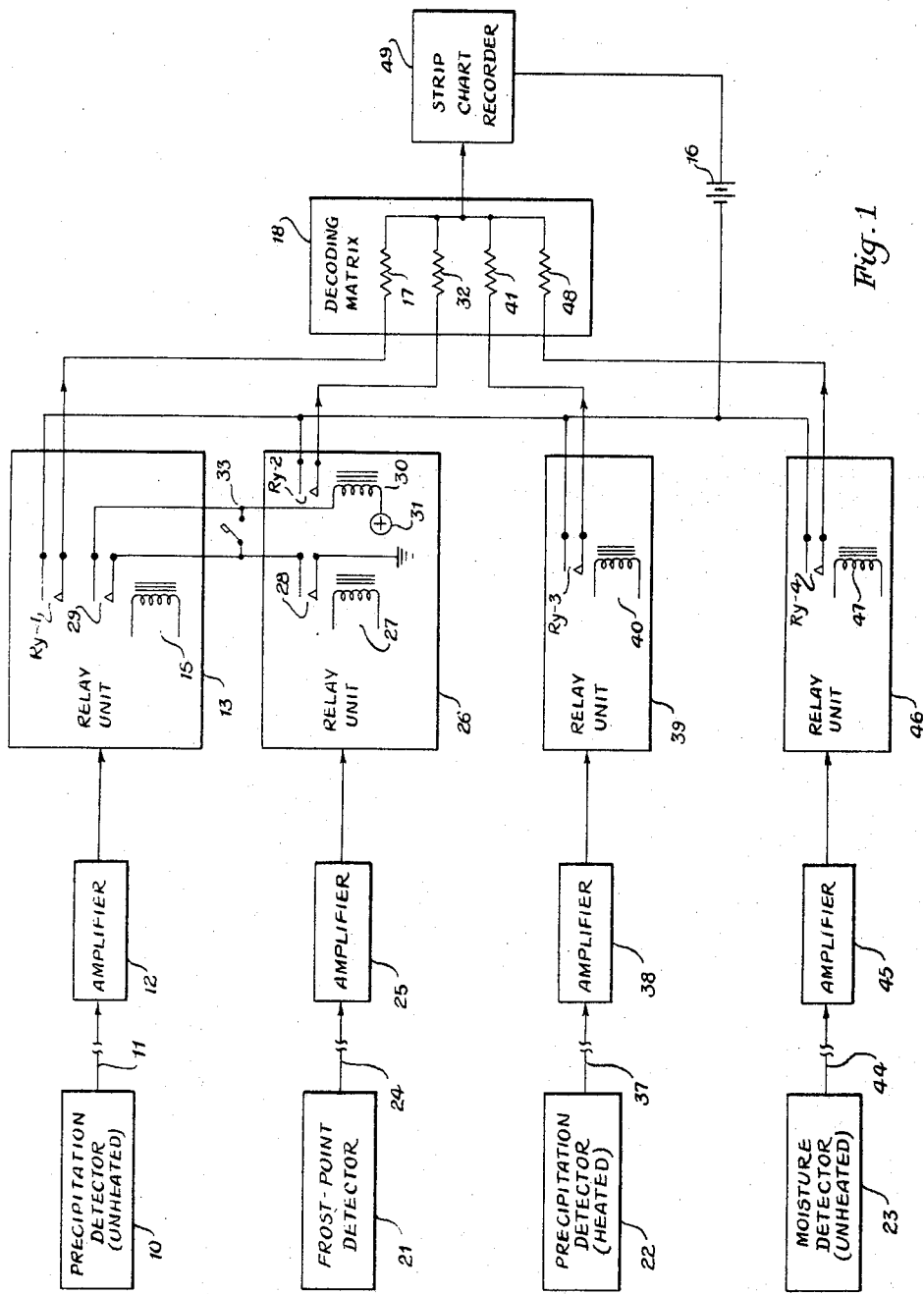
Figure 5:
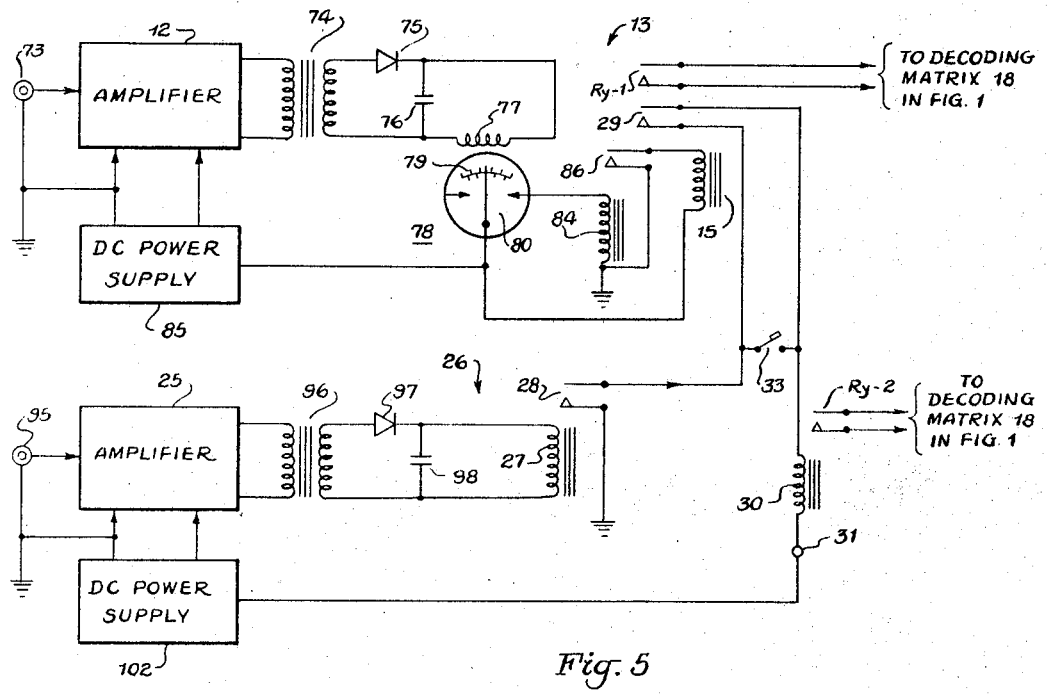
Figure 6:
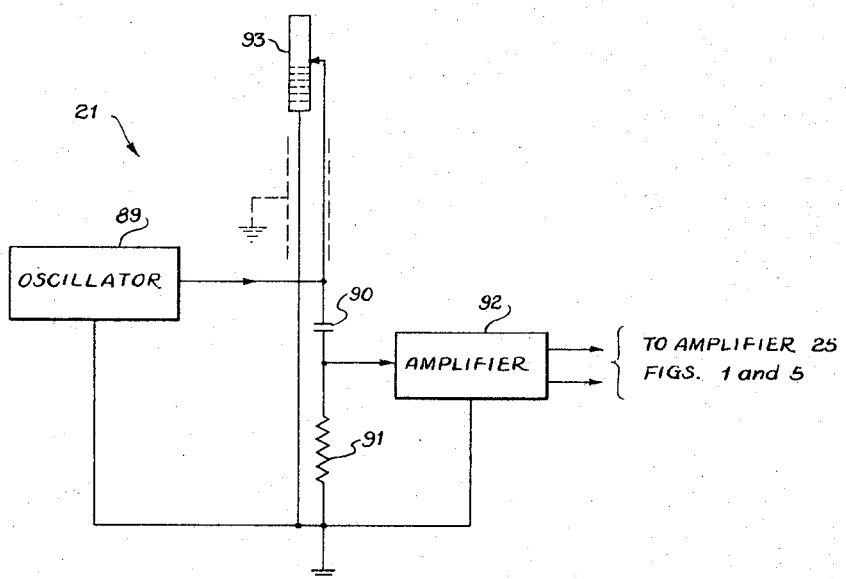
Figure 7:
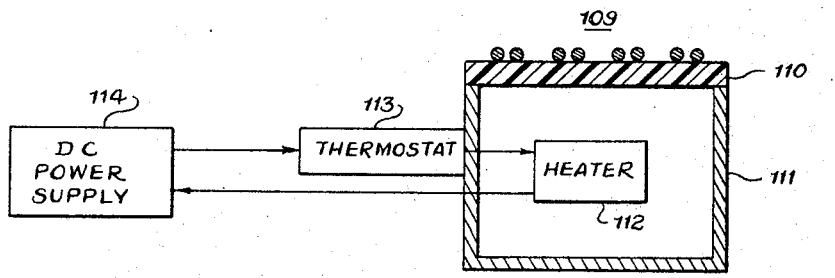
Figure 8:
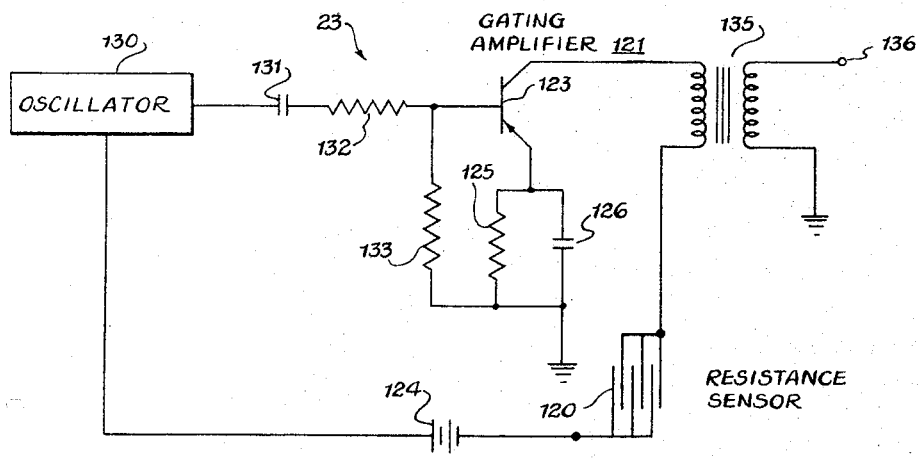

In the figures:
FIG. 1 is a block diagram of an embodiment of the present invention;
FIG. 2 is a chart used in explaining the operation of the embodiment in FIG. 1;
FIG. 3 is a circuit diagram of precipitation detector 10 in FIG. 1;
FIG. 4 is a detail drawing of the sensor-detector 51 shown in FIG. 3;
FIG. 5 is a circuit diagram of relay units 13 and 26 in FIG. 1;
FIG. 6 is a circuit diagram of frost-point detector 21 in FIG. 1;
FIG. 7 is a detail drawing of the sensor used in precipitation detector 22 shown in FIG. 1; and
FIG. 8 is a circuit diagram of moisture detector 23 in FIG. 1.

*Brief description*

In applying the underlying principles of the present invention, meteorological parameters are sensed at a location to generate signals that are a function of the parameters. The signals are then applied to a matrix to determine the atmospheric conditions that prevail at the location.

In one embodiment, a detector provides an output signal in response to all forms of precipitation, frozen or liquid, and a frost-point detector develops a signal when the ambient temperature falls below a predetermined level, say, 32° F. Another detector generates a signal in response to rain, snow or sleet, while a moisture detector provides a signal in response to moisture deposited from the atmosphere. These signals are fed to a decoding matrix whose output indicates the prevailing atmospheric condition, namely, light dew, heavy dew or drizzle, frost, rain, snow, or freezing rain or melting snow. The output of the matrix is applied to a utilization circuit, such as a strip chart recorder.

*Description of the system*

Unheated precipitation detector 10 (FIG. 1) is located at a remote site and generates an output signal in response to all forms of precipitation, liquid or frozen. The signal is transmitted over a long length of noncritical coaxial cable 11 to amplifier 12 in a local station, where the signal is amplified and sent to relay unit 13. This relay unit is shown in detail in FIG. 5. The amplified signal effects the operation of relay 15, closing contacts Ry–1. A negative potential is then applied from battery 16 through contacts Ry–1 to resistor 17 in decoding matrix 18.

A negative potential on the fixed contacts of Ry–1 to Ry–4 will be referred to as a 1 signal while the absence of potential on these contacts will be referred to as a 0 signal. Detectors 10 and 21 to 23 are positioned at the remote site and the other components in FIG. 1 are positioned at the local station.

Frost-point detector 21 develops a signal when the temperature of the atmosphere of the ambient temperature is below 32° F. The signal is sent over coaxial cable 24 to amplifier 25 and, after being amplified, is sent to relay unit 26 where the signal causes relay 27 to be energized. Relay unit 27 is shown in detail in FIG. 5. Contacts 28 close and when precipitation is sensed by detector 10, contacts 29 make to complete a circuit through relay 30 to positive potential terminal 31. The latter relay will then be activated to close contacts Ry–2 and a 1 signal will be applied to resistor 32 in matrix 18. In this way relays 15 and 27 are interlocked to prevent an indication of ambient temperature below 32° F. unless frost is sensed by detector 10. A dry temperature indication may be obtained by closing switch 33.

Precipitation detector 22 develops an output signal in response to rain, snow or sleet, but since it is heated this detector will not respond to small amounts of precipitation such as dew and frost. The signal is fed through coaxial cable 37 to amplifier 38, is amplified and fed to relay unit 39 to activate relay 40. Contacts Ry–3 then close and a 1 signal is applied to resistor 41 in matrix 18.

Moisture detector 23, which is not heated, provides an output signal in response to moisture deposited on its sensor from the atmosphere, but will not respond to moisture in the frozen state. This signal is applied through coaxial cable 44 and amplifier 45 to relay unit 46 where it is used to pick up relay 47. Contacts Ry–4 then make and a 1 signal appears on resistor 48 in matrix 18.

In matrix 18, the resistors 17, 32, 41 and 48 form a simple voltage divider and the values of these resistors are chosen to give voltage increments as each relay 15, 30, 40 and 47 is activated to represent dew, frost, rain, etc. The output of matrix 18 is applied to strip chart recorder 49 to provide a step type record. It will be understood that the output signals derived from the relays could be applied to any one of a variety of utilization circuits. These circuits may include any conventional arrangement capable of activating a device, recording, reporting, storing, printing out or retransmitting decisions derived from selected combinations of relay closures or 1 and 0 signals.

In a typical operation of the present system, light to moderate dew formation will cause precipitation detector 10 to close relay 15. Detectors 21, 22 and 23 will not respond. The coded output for dew is, therefore, 1–0–0–0. (See FIG. 2). Heavy dew deposits will be sensed by detectors 10 and 23 and contacts Ry–1 and Ry–4 will close. The output code for heavy dew is 1–0–0–1. Drizzle will also give this indication and must be so interpreted during daylight hours.

Frost will activate detector 10 and frost-point detector 21. The coded output for frost is 1–1–0–0. Rain will be detected by the detectors 10, 22 and 23 but not by detector 21. The output code for rain is therefore 1–0–1–1. Snow will be sensed by all detectors except the unheated moisture detector 23. The code for snow is 1–1–1–0. Freezing rain or melting snow would normally operate all detectors to provide a code 1–1–1–1. The latter code frequently denotes a period of transition during which the output of matrix 18 intermittently defines snow or rain until the final indication of freezing rain or melting snow is indicated. This occurs because the precipitation during the transition is on the borderline between freezing and melting so that frost-point detector 21 and moisture detector 23 or both cycle between generating a 0 and a 1 signal.

It will be apparent that the detectors in FIG. 1 could be used in different combinations to selectively indicate the presence of certain atmospheric conditions. A system intended to differentiate between rain and snow would comprise moisture detector 23 and heated detector 22. The output code for snow would be 0–1 and 1–1 for rain.

Another system for rain or snow would comprise precipitation detector 22 and frost-point detector 21. The code for rain would then be 1–0 and for snow 1–1.

The occurrence of either dew or frost could be identified by a system comprising unheated precipitation detector 10 and frost-point detector 21. The code for dew would be 1–0 and 1–1 for frost. A system formed by precipitation detector 10 and moisture detector 23 can also identitfy dew or frost as such.

The detectors in the systems outlined above would, of course, utilize the associated circuits shown in FIG. 1.

*Description of circuits*

Precipitation detector 10 (FIG. 1) provides a signal having a magnitude dependent upon all forms of precipitation, liquid or frozen. The detector employs a sensor-capacitor 51 (FIG. 3) that comprises two wires 52 (FIG. 4) insulated with polytetrafluoroethylene (Teflon) loosely wound together to form two electrically separated conductors or capacitor plates. The wires are arranged in the form of a grid, firmly mounted on a polystyrene plate 53. One end of one wire is connected to terminal 54 situated in ceramic pillar 55 in the plate and one end of the other wire is connected to terminal 56 connected to ceramic pillar 57.

The sensor-capacitor 51 is positioned in an arm of a bridge circuit 60 which is powered by the output of oscillator 62 applied across one diagonal of the bridge. The bridge circuit includes capacitor 62, variable resistors 63 and 64 and thermistor 65 connected in parallel with carbon resistor 66. The thermistor compensates for changes in the impedance of sensor-capacitor 51 due to elongation and contaction of wires 52 resulting from temperature variations. Since resistor 66 cooperates with the thermistor to provide less temperature compensation than if the thermistor were used by itself, by selecting the proper value of the resistor, the desired degree of temperature compensation is achieved.

Variable resistors 63 and 64 are used to balance bridge circuit 60 so that the magnitude of the signal, developed across resistor 67, is substantially zero when sensor-capacitor 51 is dry. An increase in precipitation on sensor-capacitor 51 increases its dielectric constant and resulting capacity, thereby unbalancing bridge circuit 60 to cause an output signal to appear across resistor 67. The magnitude of the signal is a function of the amount of precipitation deposited on sensor-capacitor 51.

The output signal is transmitted through capacitor 68 to the input 73 (FIG. 5) of amplifier 12. The signal is then amplified, is passed through transformer 74 and diode 75 and filtered in capacitor 76. The resulting DC voltage is applied to coil 77 of meter-relay 78 which includes a scale 79 and a single-pole, double-throw switch 80. The high and low limit contacts of the switch are adjustable to any position on the scale, thus providing a wide range of relay sensitivity.

When the voltage developed across capacitor 76 reaches a predetermined level, indicating a certain amount of precipitation on sensor-capacitor 51, relay 77 is energized and moves the arm of switch 80 to the right in FIG. 5. Relay 84 is then energized by DC power supply 85 and contacts 86 make to pick up relay 15. Contacts Ry–1 close, applying a 1 signal to decoding matrix 18.

Frost-point detector 21, shown in detail in FIG. 6, develops an output signal when the temperature of the atmosphere is below 32° F. Oscillator 89 generates a constant amplitude AC signal which appears across capacitor 90 and resistor 91. The input of amplifier 92 is connected across the resistor, while the 32° mercury column switch 93 is connected across capacitor 90 and resistor 91. When the ambient temperature is above 32° F., mercury switch 93 short circuits the output signal of oscillator 89. However, when the switch is exposed to freezing conditions, the mercury column falls below the contact points in the switch, the short circuit is removed and the oscillator signal is passed through amplifier 92 to the input 95 of amplifier 25 (FIGS. 1 and 5). The signal is amplified and coupled through transformer 96 and diode 97 (FIG. 5) to smoothing capacitor 98.

The DC signal, developed across capacitor 98, energizes relay 27 to close contacts 28. When precipitation is sensed by detector 10 and relay 15 is activated, contacts 29 make to complete a circuit through terminal 31 to power supply 102, which picks up relay 30. Contacts Ry–2 are then closed to apply a 1 signal to decoding matrix 18. Thus relays 15 and 27 are interlocked to prevent an indication of ambient temperature below 32° F. unless frost is actually present on the sensing-capacitor 51 of moisture detector 10 (FIGS. 1 and 3). A dry temperature indication may be had if desired by closing switch 33.

Precipitation detector 22 is identical to detector 10 (FIG. 3) except that capacitor-sensor 109 (FIG. 7) is heated. The capacitor-sensor is mounted on a polystyrene plate 110 which in turn is located on top of an open container 111. Heater 112 is positioned in the container and is connected through thermostat 113 to DC power supply 114. The thermostat is attached to the container and is set to a temperature slightly above the ambient temperature.

Detector 22 responds to rain, snow and sleet but, because it is heated, will not respond to small amounts of precipitation such as dew and frost. The output of the detector is sent to amplifier 38 (FIG. 1) where it is amplified and then fed to relay unit 39. The latter unit is the same as relay unit 13 (FIG. 5) except that contacts 29 are omitted and relay 40 is not interlocked with relay 27 (FIG. 1). When detector 22 senses rain, snow or sleet, relay 40 is activated and a 1 signal is transmitted to decoding matrix 18.

Unheated precipitation moisture detector 23 (FIG. 1) is shown in detail in FIG. 8. Detector 23 will respond to moisture precipitated from the atmosphere but not to moisture in the frozen state. Resistance sensor 120 is a bare metal grid mounted on a Bakelite plate with two sets of electrically separated and alternately positioned fingers. The normally high resistance between the two sets of fingers is lowered by the presence of water precipitated on the surface of the plate from the moisture in the atmosphere. The resistance sensor 120 controls the gain of gating amplifier 121 by acting as a moisture-controlled variable resistor in series with battery 124 in the collector circuit of transistor 123. Since the resistance of frozen precipitation is very much higher than liquid, there is no appreciable current flow through sensor 120 in response to frozen precipitation and the sensor functions in the same manner as in the dry state. The circuit comprising resistor 125 and capacitor 126 applies the appropriate bias to the emitter of transistor 123. The output of oscillator 130 is coupled to the base of transistor 123 by means of capacitor 131 and a divider formed by resistors 132 and 133.

When moisture is deposited on resistance sensor 120 the signal, generated by oscillator 130, is sent through transistor 123 and transformer 135 to output terminal 136. The signal is then fed to amplifier 45 (FIG. 1) where it is amplified and transmitted to relay unit 46 which is identical in construction to relay unit 39. Contacts Ry-4 are then closed and a 1 signal is applied to decoding matrix 18.

*Calibration procedure*

The initial step in the calibration procedure consists in adjusting the bridge circuits in precipitation detectors 10 and 22 with sensor-capacitors 51 and 109 (FIGS. 3 and 7) in a dry condition. This may be accomplished by connecting a pair of headphones across resistor 67 (FIG. 3) by means of jacks, not shown, and adjusting variable resistors 63 and 64 for a signal null.

Sensor-capacitor 51 in precipitation detector 10 is then given a light spray of water from a conventional atomizer to simulate light dew. The gain control in amplifier 12 (FIG. 5) is adjusted to give a half-scale reading on meter-relay 78. The upper contact in switch 80 is then set to make contact with the arm of the switch, energizing relays 84 and 15 to close contacts Ry-1 and thereby indicate dew. Moisture detector 23 is sprayed lightly with water and amplifier 45 and relay unit 46 are adjusted as above to energize relay 47 and close contacts Ry-4. The heated detector 22 is sprayed heavily with water to simulate rain and amplifier 38 and relay unit 39 are adjusted for a 1 signal, which is obtained when contacts Ry-3 close.

Frost-point detector 21 is calibrated by temporarily disconnecting the lead between mercury column switch 93 and capacitor 90 (FIG. 6), permitting a signal to be transmitted to amplifier 25 (FIG. 1). The gain control of this amplifier is adjusted until relays 27 and 30 are energized and contacts Ry-2 are closed to provide a 1 signal. Switch 33 is closed during this procedure. The lead between switch 93 and capacitor 90 is then re-connected. With the sensors in all the detectors in a dry state and the ambient temperature above 32° F. none of the contacts Ry-1 to Ry-4 will be closed. Switch 33 is now opened and the system is ready for operation.

What is claimed is:
1. In a selective precipitation indicator system,
first means for detecting all forms of liquid and solid atmospheric precipitation,
second means for detecting the frost-point of the atmosphere,
third means for detecting atmospheric rain, snow, and sleet,
fourth means for detecting all forms of liquid atmospheric precipitation,
means responsive to the output signal of said first means for indicating light dew,
means responsive to the output signals of said first and fourth means for indicating heavy dew or drizzle,
means responsive to the output signals of said first and second means for indicating frost,
means responsive to the output signals of said first, third, and fourth means for indicating rain,
means responsive to the output signals of said first, second, and third means for indicating snow, and
means responsive to the output signals of said first, second, third, and fourth means for indicating freezing rain or melting snow.
2. The system set forth in claim 1 wherein said first means comprises a precipitation detector including:
a sensor-capacitor comprising two polytetrafluoroethylene insulated wires loosely wound to form two electrically separated capacitor electrodes, the polytetrafluoroethylene insulation and atmosphere forming the dielectric between said electrodes, and
means responsive to all forms of atmospheric precipitation present on said sensor-capacitor for generating an output signal.
3. The system set forth in claim 1 wherein said third means comprises a heated precipitation detector including:
a sensor-capacitor comprising two polytetrafluoroethylene insulated wires wound to form two electrically separated capacitor electrodes, the polytetrafluoroethylene insulation and atmosphere forming the dielectric between said electrodes,
means for raising the temperature of said sensor-capacitor to a predetermined level above the ambient temperature, and means responsive to rain, snow, or sleet present on said sensor-capacitor for generating an output signal.

References Cited

UNITED STATES PATENTS

| | | | |
|---|---|---|---|
| 2,663,190 | 12/1953 | Ilgenfritz | 73—336.5 |
| 2,717,957 | 9/1955 | Ohlheiser. | |
| 2,849,701 | 8/1958 | Clark | 340—234 XR |
| 3,037,165 | 5/1962 | Kerr | 324—61 |
| 3,164,820 | 1/1965 | Hulett | 340—234 |
| 3,269,180 | 8/1966 | Schreiber | 234—61 XR |
| 3,287,974 | 11/1966 | Ciemochowski | 307—235 XR |

RUDOLPH V. POLINEC, *Primary Examiner.*

E. E. FUBASIEWICZ, *Assistant Examiner.*

U.S. Cl. X.R.

324—65; 340—234, 235